United States Patent
Ye et al.

(10) Patent No.: US 6,701,334 B1
(45) Date of Patent: Mar. 2, 2004

(54) METHODS AND APPARATUS FOR IMPLEMENTING INDIVIDUAL CLASS LOADERS

(75) Inventors: Tao Ye, Sunnyvale, CA (US); Bartley H. Calder, San Jose, CA (US); Jesus David Rivas, San Francisco, CA (US); Jonathan D. Courtney, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/465,995

(22) Filed: Dec. 16, 1999

Related U.S. Application Data (60) Provisional application No. 60/143,428, filed on Jul. 13, 1999.

(51) Int. Cl.[7] .................................................. G06F 17/30
(52) U.S. Cl. ........................................ 707/206; 717/166
(58) Field of Search ............................... 707/100–102, 707/103 R, 103, 104.1, 205, 206; 709/104–108, 201–203; 717/162–167

(56) References Cited

U.S. PATENT DOCUMENTS

| | | | | |
|---|---|---|---|---|
| 5,727,147 A | * | 3/1998 | van Hoff | 709/200 |
| 5,815,718 A | * | 9/1998 | Tock | 717/166 |
| 5,950,008 A | * | 9/1999 | van Hoff | 717/139 |
| 5,966,542 A | * | 10/1999 | Tock | 717/166 |
| 6,085,030 A | * | 7/2000 | Whitehead et al. | 709/203 |
| 6,202,208 B1 | * | 3/2001 | Holiday, Jr. | 717/166 |
| 6,223,346 B1 | * | 4/2001 | Tock | 717/166 |
| 6,266,716 B1 | * | 7/2001 | Wilson et al. | 710/33 |
| 6,279,030 B1 | * | 8/2001 | Britton et al. | 709/203 |
| 6,339,841 B1 | * | 1/2002 | Merrick et al. | 717/166 |
| 6,374,286 B1 | * | 4/2002 | Gee et al. | 709/108 |
| 6,430,564 B1 | * | 8/2002 | Judge et al. | 707/100 |
| 6,430,570 B1 | * | 8/2002 | Judge et al. | 707/103 R |
| 6,442,565 B1 | * | 8/2002 | Tyra et al. | 707/103 |
| 6,496,871 B1 | * | 12/2002 | Jagannathan et al. | 709/317 |
| 6,507,946 B2 | * | 1/2003 | Alexander et al. | 717/145 |
| 6,513,155 B1 | * | 1/2003 | Alexander et al. | 717/124 |
| 6,519,594 B1 | * | 2/2003 | Li | 707/10 |

FOREIGN PATENT DOCUMENTS

| | | |
|---|---|---|
| EP | 0333617 | 9/1989 |
| EP | 0524071 A1 | 7/1992 |
| EP | 0908821 A1 | 4/1999 |

OTHER PUBLICATIONS

R.B. Bunt: *Scheduling Techniques For Operating Systems*, Computer, Oct. 1976, pp. 10–17, XP000199223.

R. Thom: *Multitasking Fuer Mikrocontroller, Parallelverarbeitung fur sequentielle Systeme mit OS–51*, Elektronik, 15/20.7.1990, XP000138192, no translation.

McDowell, C.E. & Baldwin, E.A.: "Unloading Java Classes that Contain Static Fields". Technical report UCSC-CRL–97–18, Online! Aug. 25, 1997, pp. 1–9. XP002157433 Santa Cruz (CA) Retrieved from the Internet: URL:http://cs–tr.cs.cornell.edu:80/Dienst/UI/1.0/Display/ncstrl.ucsc_cse/UCSC–CRL–9–7–18 'retrieved on Jan. 16, 2001! The whole document.

(List continued on next page.)

*Primary Examiner*—Maria N. Von Buhr
(74) *Attorney, Agent, or Firm*—Beyer Weaver & Thomas, LLP (57) ABSTRACT

Methods and apparatus for loading and unloading classes associated with an application are disclosed. A class loader adapted for loading classes associated with an application is constructed. The class loader is employed to load one or more classes associated with the application such that the class loader maintains a reference to the one or more classes. The class loader for the application is then de-referenced such that the class loader is unreachable.

37 Claims, 8 Drawing Sheets

OTHER PUBLICATIONS

Foote, B. & Mitchell, J.D.: "Singletons vs. class (un)loading", JAVAWORLD, 'Online! XP002157434 Retrieved from the Internet: URL:http://www.javaworld.com/javaworld/javatips/jw-javatip52_p.html 'retrieved on Jan. 16, 2001! The whole document.

"Java TV API Specification", Sun Microsystems, Inc., Preliminary Draft 0.5.2, pp. 1–45. (was available on the Internet on approximately Jun. 14, 1999, not earlier than Jun. 1, 1999, and was provided to the standards body on May 12, 1999).

S. Deering, "Host Extensions for IP Multicasting", Network Working Group, Stanford University, RFC 1112, Aug. 1989, pp. 1–17.

Y. Rekhter, et al., "Address Allocation for Private Internets", Network Working Group, Silicon Graphics, Inc., RFC 1918, Feb. 1996, pp. 1–9.

D. Meyer, "Administratively Scoped IP Multicast", Network Working Group, University of Oregon, RFC 2365, Jul. 1998, pp. 1–8.

* cited by examiner

METHODS AND APPARATUS FOR IMPLEMENTING INDIVIDUAL CLASS LOADERS

CROSS REFERENCE TO RELATED APPLICATIONS

This application claims priority of provisional U.S. patent application Ser. No. 60/143,428, filed Jul. 13, 1999, entitled "JAVA TV API SPECIFICATION."

This invention is related to U.S. patent application Ser. No. 09/465,980 (attorney docket no. SUN1P502), filed on the same day as this patent application, naming Bartley H. Calder et al. as inventors, and entitled "METHODS AND APPARATUS FOR MANAGING AN APPLICATION." That application is incorporated herein by reference in its entirety and for all purposes.

This invention is related to U.S. patent application Ser. No. 09/465,994 (attorney docket no. SUN1P507), filed on the same day as this patent application, naming Tao Ye et al. as inventors, and entitled "METHODS AND APPARATUS FOR IMPLEMENTING AN APPLICATION LIFECYCLE DESIGN FOR APPLICATIONS." That application is incorporated herein by reference in its entirety and for all purposes.

BACKGROUND OF THE INVENTION

1. Field of the Invention

The present invention relates generally to computer software. More particularly, the present invention relates to methods and apparatus for implementing a class loader adapted for loading classes associated with an application.

2. Description of the Related Art

The digital television revolution is one of the most significant events in the history of broadcast television. With the advent of digital television, high speed data transfer is possible via satellite, cable and terrestrial television channels. Digital television will offer users more channels as well as significantly improved video and audio quality. Most importantly, digital television ushers in the age of true interactive television. For instance, digital receivers will be able to offer users a variety of enhanced services, from simple interactive quiz shows, to Internet over the air, and a mix of television and web-type content. As the market for digital television grows, content developers are looking for a feature-rich, cost-effective, and reliable software platform upon which to build the next generation of interactive television services such as Electronic Programming Guides, Video-On-Demand, and Enhanced Broadcasting.

Java is a leading commercial object-oriented language designed as a portable language. A Java program can be written and compiled once and run on any compatible device that supports the JAVA™ PLATFORM. For instance, Java is incorporated into all major Web browsers. Thus, Java runs on any web-enabled computer via that computer's Web browser. As such, it offers great promise as the software platform for the next generation of set-top boxes and digital televisions.

In object-oriented programmning, runtime data are represented by objects. Each object is defined via its class, which determines the properties of an object. In other words, objects are individual instances of a class. To run a Java application, the related classes are loaded into memory. Instances of these classes are then constructed following the flow of the program. Most object-oriented languages require that all objects that are created be actively destroyed by the programmer when they are no longer needed. However, implementations of the Java Virtual Machine typically automate this process and perform garbage collection to increase the amount of available memory. Accordingly, objects are deleted or "garbage collected" automatically by the Java runtime environment when they are no longer referenced.

Although instances of classes that are no longer referenced are removed from memory through garbage collection, the associated classes are not removed from memory. Moreover, since Java is a dynamic language, class loading is commonly performed. However, there is currently no mechanism for unloading the classes, even when they are no longer needed. As a result, the JAVA PLATFORM will eventually store a large number of classes.

In the desktop environment, classes need not be unloaded since memory is relatively unlimited. Moreover, once the browser is turned off (or closed), the classes are cleared from memory. However, space is a valuable resource in the environment of embedded systems, particularly in the area of digital television. Moreover, in the digital television environment, it will be common to run multiple applications. For instance, when a television viewer changes the channel, each associated service will likely require that a new application with multiple classes be loaded. As a result, memory will continually be allocated to the loaded classes until the limited amount of memory is consumed. Once the memory is consumed, it will be impossible to run any further applications. It will therefore be desirable to monitor the memory utilization and remove those classes that are no longer needed by the applications. This is particularly important since it will be undesirable to reboot the television in the event of an error.

In view of the above, there is a need for improved ways to manage storage of classes in memory.

SUMMARY

The present invention enables classes to be dynamically unloaded from memory when they are no longer needed. This is accomplished, in part, through the use of an individual class loader associated with each application. In this manner, memory consumption within a digital television is managed to make better use of limited memory resources.

According to one aspect of the invention, an application manager is adapted for constructing a class loader for an application. For instance, a specialized class loader may be constructed (e.g., instantiated) to load classes associated with an application that is to be loaded via a digital television receiver. Accordingly, the class loader is employed to load one or more classes associated with the application.

According to another aspect of the invention, an application manager is adapted for monitoring and managing execution of the application and de-referencing the constructed class loader when execution of an application ends or when execution of the application is terminated (e.g., by a signal). Thus, when the application manager determines that the application has terminated, the classes are unloaded since they are no longer needed. This is accomplished, in part, by de-referencing the class loader for the application such that the class loader becomes unreachable. Since the class loader is the last to maintain a reference to the classes that it has loaded into the execution environment, these classes become unreachable when the class loader is de-referenced, provided no other instances in the runtime environment reference the classes. Accordingly, when garbage collection is performed, the classes are effectively unloaded.

According to yet another aspect of the invention, the present invention is implemented on a JAVA PLATFORM. The JAVA PLATFORM provides an ideal development and deployment platform for this emerging class of interactive services. The Java programming language provides content developers with a high degree of control and flexibility of the "look and feel" of their applications, enabling them to deliver the most dynamic and compelling interactive television experiences to their audience. The garbage collection process is leveraged to shift the burden of memory allocation and memory management from the programmer to the platform. In addition, interactive television applications written in the Java programming language offer security, extensibility, and portability across a diverse array of television receivers, saving content developers time and money getting their interactive applications to market.

The present invention utilizes individual class loaders to load and unload classes associated with each application. Through the de-referencing of the appropriate class loaders when it is determined that the associated classes are no longer needed, the garbage collection process is leveraged to maximize the amount of available memory. This is particularly important in systems having limited memory, such as in a digital television receiver.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

An invention is described herein that enables classes to be unloaded dynamically. More particularly, classes may each be represented by a class object, which includes the definition of the associated class. Therefore, the terms "class" and "class object" are used interchangeably throughout.

Figure 1:
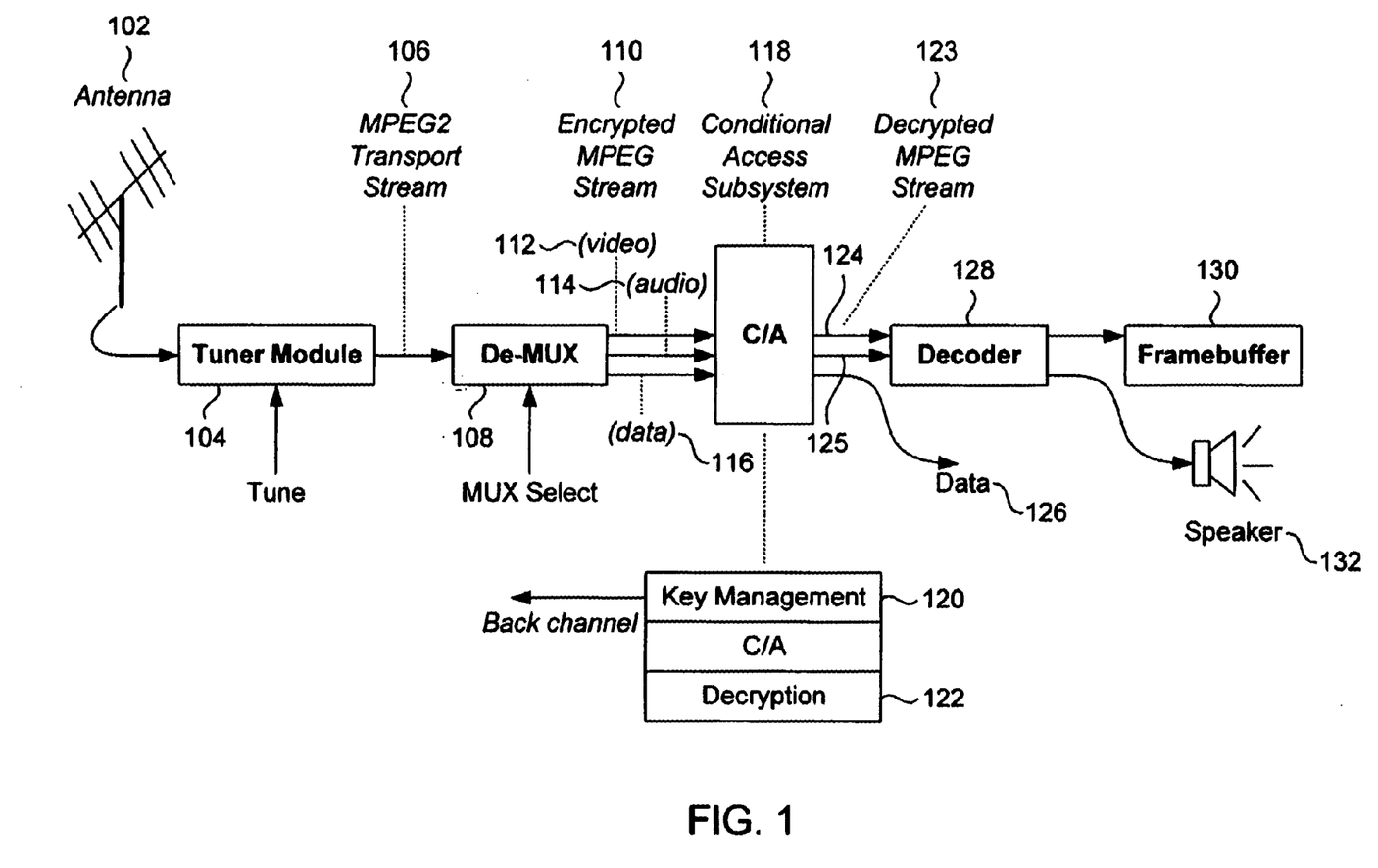
FIG. 1 is a block diagram illustrating a system in which the present invention may be implemented.

The invention is described within the context of a digital television and digital television receiver. FIG. 1 is a block diagram illustrating an exemplary digital television receiver. As shown, a signal is received via antenna 102 and tuned by tuner module 104, producing MPEG2 transport stream 106. De-multiplexer 108 then produces encrypted MPEG stream 110 including a video stream 112, an audio stream 114, and a data stream 116. These three streams are then processed by conditional access subsystem 118. For instance, the conditional access subsystem 118 may utilize key management information 120 as well as decryption information 122 (e.g., decryption algorithms). The conditional access subsystem 118 produces decrypted MPEG streams 123 including a video stream 124 and audio stream 125 as well as data 126, all of which are decrypted. A decoder 128 then processes the decrypted MPEG stream 123, and forwards the decoded video data to frame buffer 130 and transmits the decoded audio data to speaker 132.

A Java Virtual Machine (JVM) is one platform that may be used to implement the present invention by processing information received by a digital television receiver such as that illustrated in FIG. 1. More particularly, when the data 126 is processed, it could contain Java applications that are composed of many classes. It is therefore desirable to load and unload classes dynamically to minimize the memory consumption in a digital television or digital television receiver (or set-top box), which is typically limited in memory.

Figure 2:
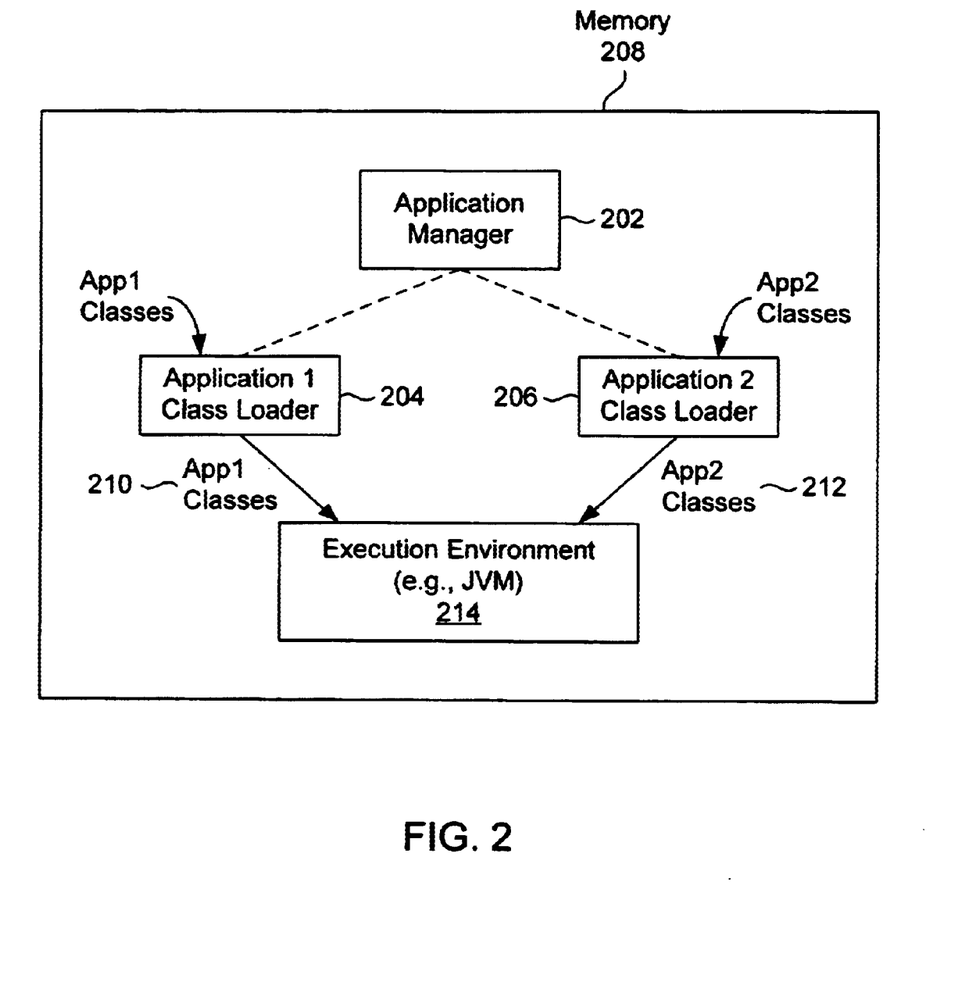
FIG. 2 is a block diagram illustrating one embodiment of the invention during the loading of classes.

The present invention enables the loading and unloading of classes for each application through the instantiation of an individual class loader for each application. FIG. 2 is a block diagram illustrating one embodiment of the invention. As shown, an application manager 202 is provided to manage the loading of classes as well as the execution of applications on the platform. One method of implementing the application manager 202 will be described in further detail with reference to FIG. 7. More particularly, the loading of classes is managed, in part, through the creation of an individual class loader for each application. Thus, the application manager 202 instantiates a first class loader 204 adapted for loading classes associated with a first application (APP1). Similarly, the application manager 202 instantiates a second class loader 206 adapted for loading classes associated with a second application (APP2). The application manager 202 and the class loaders 204 and 206 are stored in a memory 208. The class loaders 204 and 206 then load classes for the respective applications. More particularly, as shown, the first application class loader 204 loads a first set of classes 210 associated with the first application and the second application class loader 206 loads a second set of classes 212 associated with the second application. In this manner, the first and second sets of application classes 210 and 212 are loaded into execution environment 214 (e.g., JVM). Once loaded, the classes may be accessed during execution of each of the applications.

Figure 3:
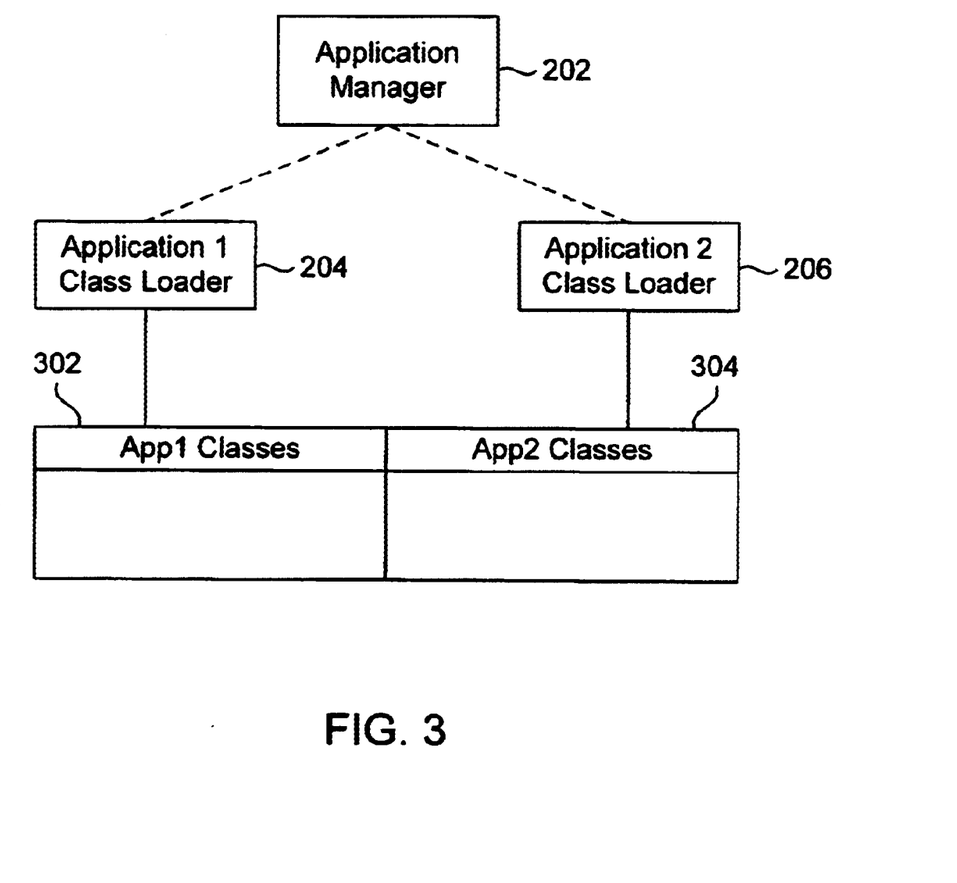
FIG. 3 is a block diagram illustrating one embodiment of the invention during execution of an application.

Referring now to FIG. 3, a block diagram illustrating one embodiment of the invention upon completion of the class loading process is presented. FIG. 3 is, for example, associated with execution of first and second applications by the JVM. As shown, the application manager 202 maintains a link (e.g., reference) to the first application class loader 204 as well as to the second application class loader 206. In addition, the first application class loader 204 maintains a link (e.g., reference) to the first set of application classes 302. Similarly, the second application class loader 206 maintains a link (e.g., reference) to the second set of application classes 304. For example, each link may be implemented through the use of a pointer. The application manager 202 continues to reference all of the class loaders 204 and 206 during execution of the respective applications. In addition, the class loaders 204 and 206 reference the application classes 302 and 304, respectively, during execution of the respective applications. In one implementation, the first and second sets of application classes are stored in a JVM stack residing in memory (e.g., memory 200). As an example, the memory may be Random Access Memory (RAM).

Figure 4:
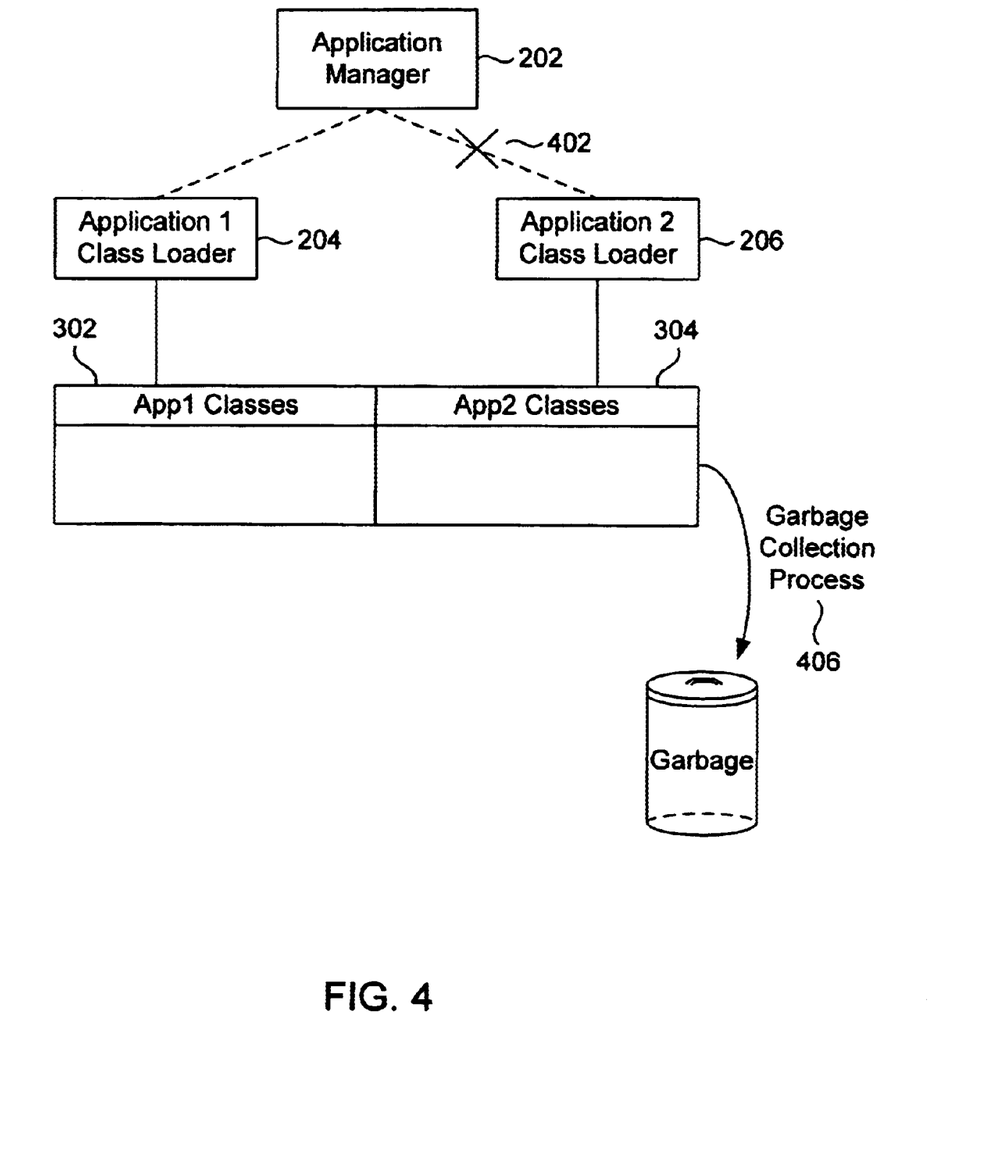
FIG. 4 is a block diagram illustrating one embodiment of the invention upon completion of execution of the application.

When execution of one of the applications ends or the application is stopped prior to completion, the application manager 202 de-references the appropriate class loader. FIG. 4 is a block diagram illustrating one embodiment of the invention following completion of execution of the second application. When execution of the second application ends or is stopped prematurely, the application manager 202 de-references the second application loader 206. In other words, the application manager 202 removes the link to the second application loader as shown at 402. For example, the original reference variable to the second application loader 206 may be set to null. For instance, a reference variable to the second application loader 206 may be set to null After the second class loader 206 is de-referenced, the second class loader 206 becomes an unreachable object in memory. As described above, when an object (i.e., instance of a class) or a class has no reference to it, it is "unreachable" and will therefore be garbage collected. Since the second class loader 206, as the last reference to the second set of application classes 304 and associated instances, is unreachable, garbage collection 406 subsequently removes the associated classes 304 (e.g., class objects) as well as all instances of the classes 304 (i.e., objects), since they are also unreachable at the moment. Thus, classes referenced by the de-referenced class loader 206 are garbage collected and the allocated memory is returned to the available memory pool. Additional details on the JVM, including "unreachability" and garbage collection, are contained in "The Java Virtual Machine Specification", Second Edition, Lindholm, Yellin, ISBN 0-201-43294-3, which is hereby incorporated by reference.

Figure 5:
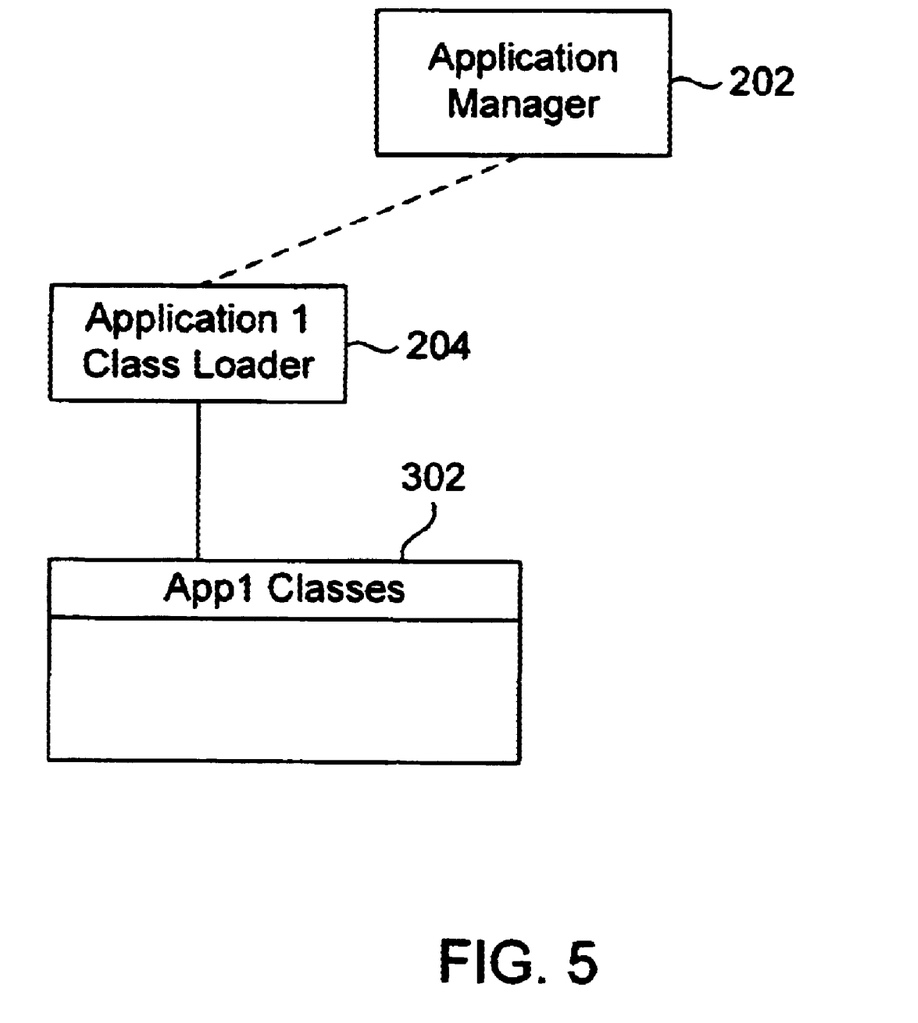
FIG. 5 is a block diagram illustrating one embodiment of the invention after one round of garbage collection is completed.

After garbage collection is completed, all unreachable classes and objects are no longer resident in memory. As shown in FIG. 5, once garbage collection is performed on the system shown in FIG. 4, the unreachable class loader, unreachable classes and associated instances are deleted from memory. As a result, only the first application loader 204 and the first set of classes 304 remain. Consequently, the invention serves to free up memory resources in a dynamic manner so that the limited memory resources (e.g., of the digital television receiver) can be better utilized.

Figure 6:
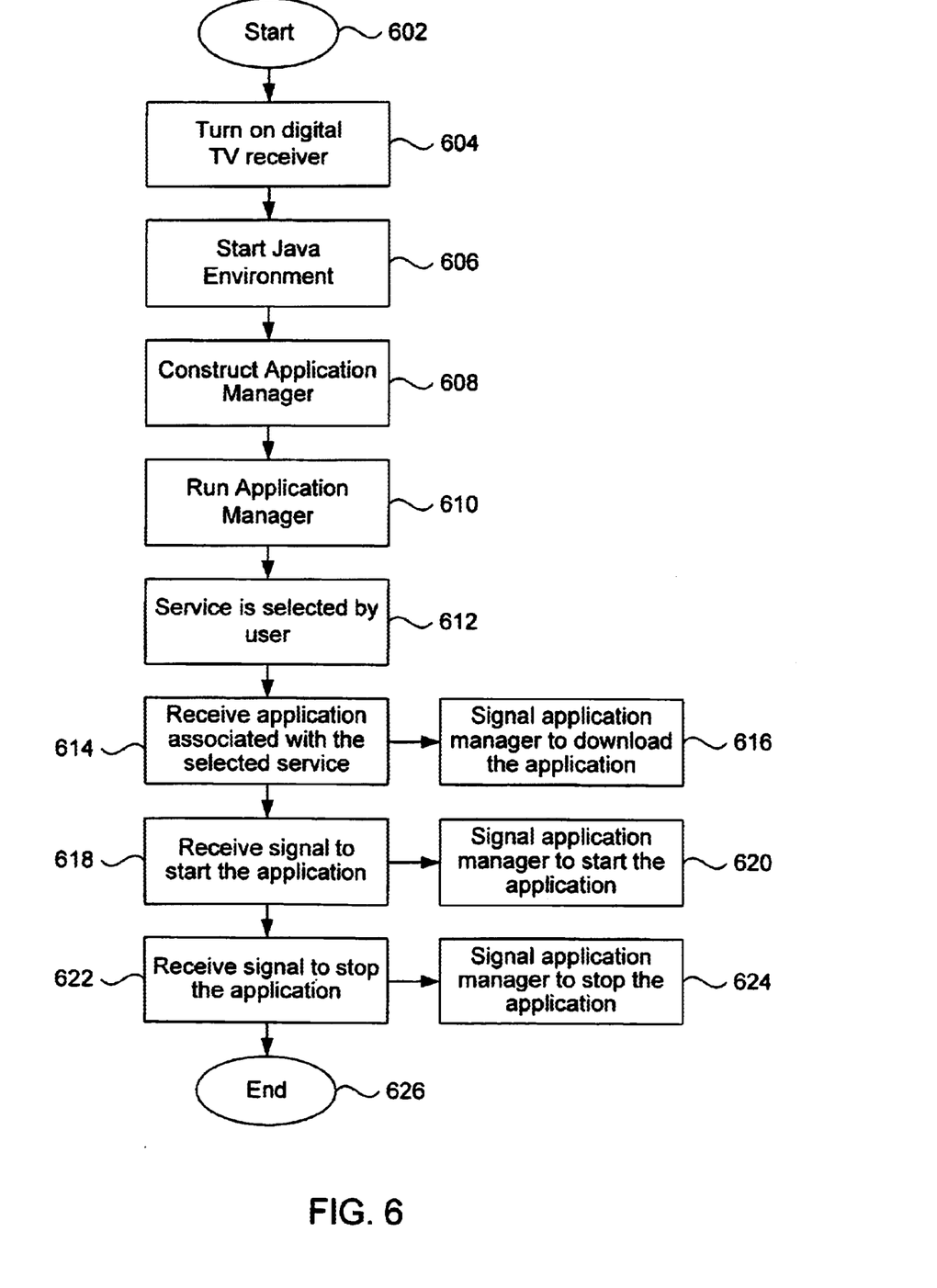
FIG. 6 is a process flow diagram illustrating one method of executing an application on a digital TV receiver according to one embodiment of the invention.

FIG. 6 is a process flow diagram illustrating one method of executing an application transmitted via a digital TV receiver according to one embodiment of the invention. The process begins at block 602 and at block 604 the digital television receiver is turned on. The Java™ environment is then started at block 606. An application manager is then constructed at block 608 and run at block 610.

A variety of digital television services may be received by a digital television receiver such as that illustrated in FIG. 1. In addition to receiving a multitude of channels, these services could range from interactive television, to near video-on-demand, to specialized programming. When a service is selected by a user at block 612, an application associated with the selected service may be received via the digital television receiver at block 614. For instance, when the user selects a Disney service, there might be a Disney application that is received for enhanced viewing experience.

The application manager is responsible for monitoring and managing the execution of the application. For instance, the application manager is signaled to load and execute the application at block 616. When a start signal is received (e.g., via the digital television receiver) at block 618 to start the application, the application manager is signaled to start the application at block 620. The application executes until a stop signal is received (e.g., via the digital television receiver) at block 622, and the application manager is signaled to stop the application at block 624. The process ends at block 626.

Figure 7:
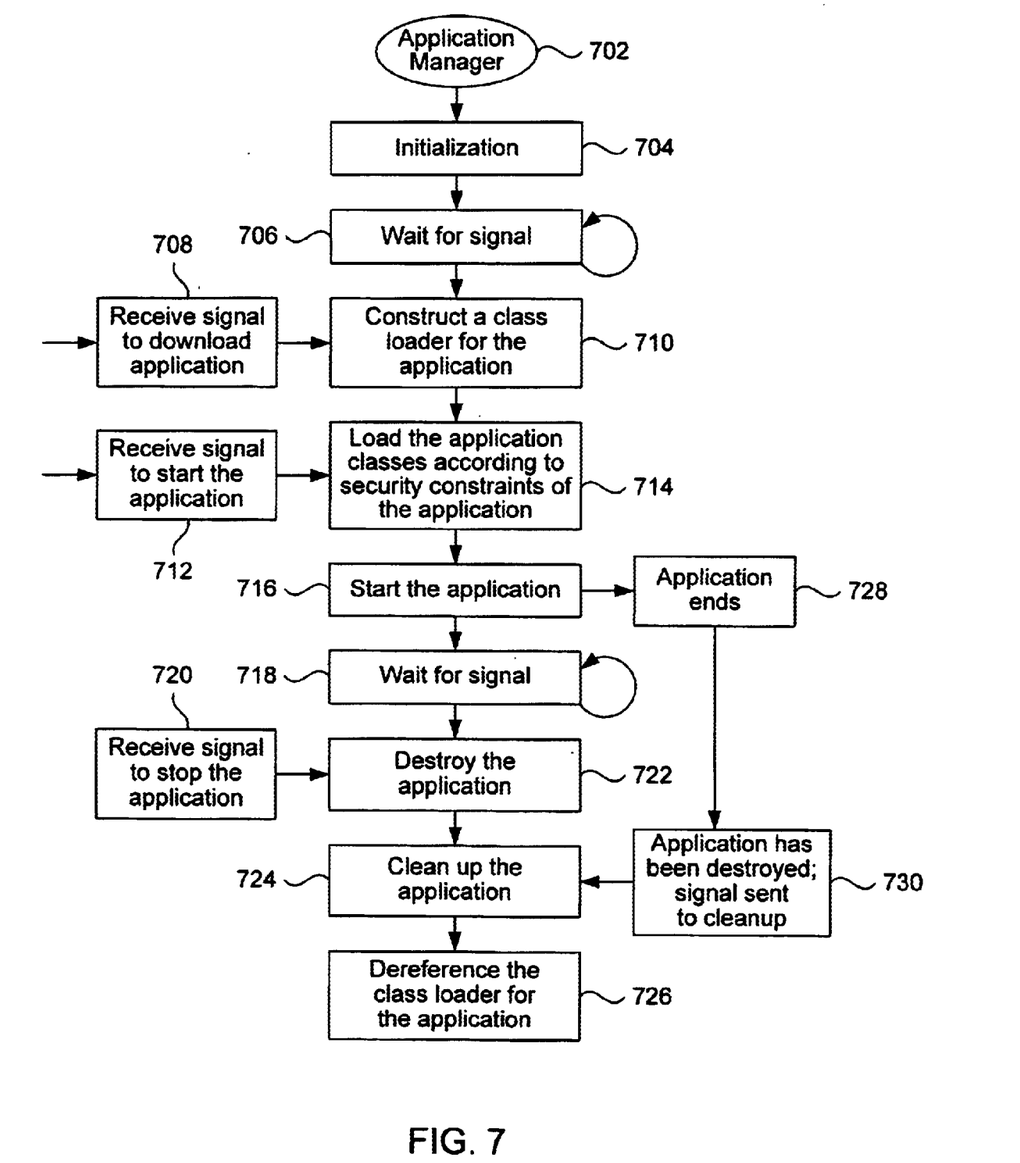
FIG. 7 is a process flow diagram illustrating one method of implementing an application manager to unload classes during execution of an application as shown in FIG. 6 according to one embodiment of the invention.

The application manager may be implemented in a variety of ways to ensure that classes that are loaded are unloaded when they are no longer needed by an application. FIG. 7 is a process flow diagram illustrating one method of implementing an application manager to unload classes during execution of an application as shown in FIG. 6 according to one embodiment of the invention. The process begins at block 702 and at block 704, the application manager performs initialization as appropriate. In addition, the application manager is responsible for managing execution one or more applications. Thus, the application manager waits for a signal (e.g., via the television receiver) as shown in FIG. 6 prior to blocks 614 and 616 indicating that the application manager is to load an application (e.g., received from the broadcast data stream), start an application, or stop an application. The application manager therefore waits for such a signal as shown at block 706. When the application manager receives a load signal indicating that the application manager is to load the application at block 708, the application manager constructs a class loader for the application 710. As described above, the class loader is designed to load one or more classes associated with the application. When the application manager receives a start signal at block 712, the application manager employs the appropriate class loader to load the application classes associated with the application at block 714. For instance, the application classes may be loaded according to security constraints of the application. Thus, the class loader can perform appropriate security checks to determine if the application can be loaded. The application manager then begins execution of the application at block 716 and waits at block 718 until the application ends or until the application is terminated prior to its completion. The application manager recognizes the termination or completion of an application through the receipt of a signal or message from the application or other process indicating that execution of the application is terminated.

When the application manager receives a stop signal to stop execution of the application prior to its completion as shown at block 720, the application is destroyed (e.g., deleted) at block 722. Cleanup associated with the destroyed application is then performed at block 724. The class loader for the application is then de-referenced at block 726.

If the application completes execution at block 728, the application sends a signal (e.g., from the application or the broadcast environment via the receiver) to the application manager to initiate cleanup of the application. For instance, any files associated with the application are deleted and any associated threads are removed. In addition, any data used for bookkeeping such as references to each application may be deleted when no longer needed. The process then continues at block 724 to cleanup the application and de-reference the class loader for the application at block 726. In other words, de-referencing may be accomplished by removing a link between the class loader and the application manager by setting a pointer (e.g., reference variable associated with the application manager) to the class loader to null. As another example, the class loader may be marked as unreachable. Since the class loader is the last to maintain a reference to the classes that it has loaded into the execution environment, these classes become unreachable when the class loader is de-referenced. Accordingly, when garbage collection is performed, the classes are effectively unloaded.

Garbage collection may be performed in a variety of ways to unload classes associated with a de-referenced class loader. For instance, garbage collection may be performed in two separate passes. In the first pass, garbage collection may search for all objects and classes that are unreachable. At this time, it may be determined that the class loader is unreachable, as well as the classes loaded by it. The classes associated with the unreachable class loader may be marked as unreachable at this time. Moreover, since the class loader is unreachable, garbage collection frees up the memory allocated to the dereferenced class loader. In the second pass, the classes loaded by the now non-existing class loader that were marked as unreachable in the previous pass will be found and removed from memory.

Figure 8:
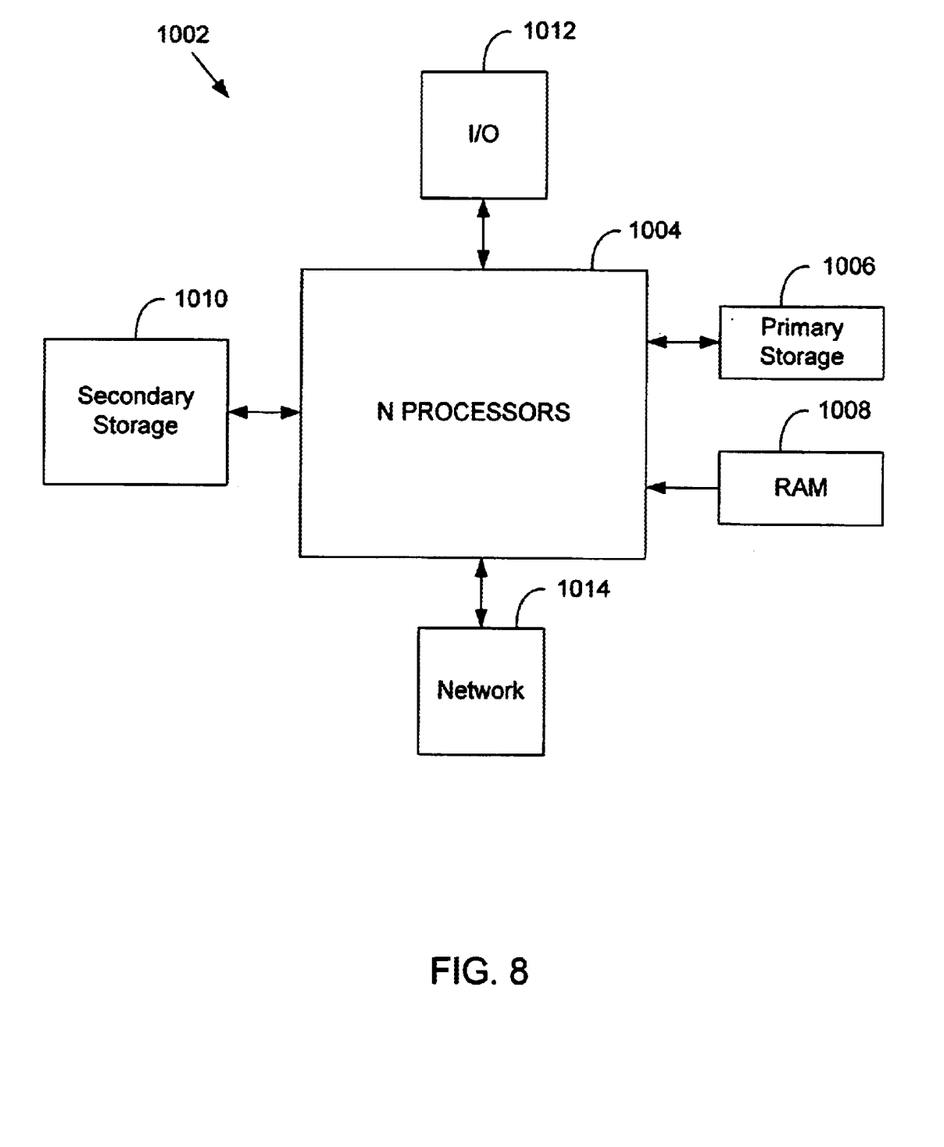
FIG. 8 is a block diagram illustrating a typical, general-purpose computer system suitable for implementing the present invention.

The present invention may be implemented on any suitable computer system. FIG. 8 illustrates a typical, general-purpose computer system 1002 suitable for implementing the present invention. The computer system may take any suitable form. For example, the computer system may be integrated with a digital television receiver or set top box.

Computer system 1030 or, more specifically, CPUs 1032, may be arranged to support a virtual machine, as will be appreciated by those skilled in the art. The computer system 1002 includes any number of processors 1004 (also referred to as central processing units, or CPUs) that may be coupled to memory devices including primary storage device 1006 (typically a read only memory, or ROM) and primary storage device 1008 (typically a random access memory, or RAM). As is well known in the art, ROM acts to transfer data and instructions uni-directionally to the CPUs 1004, while RAM is used typically to transfer data and instructions in a bi-directional manner. Both the primary storage devices 1006, 1008 may include any suitable computer-readable media. The CPUs 1004 may generally include any number of processors.

A secondary storage medium 1010, which is typically a mass memory device, may also be coupled bi-directionally to CPUs 1004 and provides additional data storage capacity. The mass memory device 1010 is a computer-readable medium that may be used to store programs including computer code, data, and the like. Typically, the mass memory device 1010 is a storage medium such as a hard disk which is generally slower than primary storage devices 1006, 1008.

The CPUs 1004 may also be coupled to one or more input/output devices 1012 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1004 optionally may be coupled to a computer or telecommunications network, e.g., an internet network or an intranet network, using a network connection as shown generally at 1014. With such a network connection, it is contemplated that the CPUs 1004 might receive information from the network, or might output information to the network in the course of performing the above-described method steps. Such information, which is often represented as a sequence of instructions to be executed using the CPUs 1004, may be received from and outputted to the network, for example, in the form of a computer data signal embodied in a carrier wave.

The present invention enables classes to be unloaded when it is determined that they are no longer needed. Through the use of an individual class loader for each application, classes are effectively loaded and unloaded when the classes are no longer needed (e.g., when the application ends or is terminated). Moreover, through the use of customized class loaders, an added level of security is provided to prevent unauthorized applications from being loaded and executed.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as enabling classes to be unloaded within the context of a digital television receiver. However, the present invention may be used to load and unload classes in other contexts. Moreover, although the present invention is described as being implemented on a JAVA PLATFORM, it may also be implemented on a variety of platforms or contexts in which object-oriented languages are used. Thus, "unreachability" may refer generally to the unavailability of those entities that are "de-referenced". Moreover, the above described process blocks are illustrative only. Therefore, the loading and unloading of classes may be performed using alternate process blocks. Accordingly, the present embodiments are to be considered as illustrative and not restrictive, and the invention is not to be limited to the details given herein, but may be modified within the scope and equivalents of the appended claims.

What is claimed is:

1. A method of loading and unloading classes by an application manager, the method comprising:

constructing a first class loader for a first application, the class loader being adapted for loading classes associated with the first application;

constructing a second class loader for a second application, the class loader being adapted for loading classes associated with the second application;

employing the first class loader to load one or more classes associated with the first application such that the class loader maintains a reference to the one or more classes associated with the first application;

employing the second class loader to load one or more classes associated with the second application such that the class loader maintains a reference to the one or more classes associated with the second application;

de-referencing the first class loader for the first application when execution of the first application ends or is terminated such that the first class loader and the one or more classes referenced by the first class loader become unreachable, thereby enabling the one or more classes referenced by the first class loader to be unloaded during garbage collection; and de-referencing the second class loader for the second application when execution of the second application ends or is terminated such that the second class loader and the one or more classes referenced by the second class loader become unreachable, thereby enabling the one or more classes referenced by the second class loader to be unloaded during garbage collection.

2. The method as recited in claim 1, wherein de-referencing the first class loader includes marking the first class loader as unreachable and de-referencing the second class loader includes marking the second class loader as unreachable.

3. The method as recited in claim 1, wherein de-referencing setting a reference to the corresponding class loader to null.

4. The method as recited in claim 1, wherein the first and second applications are each a Java program.

5. The method as recited in claim 1, further comprising:
destroying the first or second application;
wherein de-referencing the class loader for the first or second application is performed when the first or second application is destroyed.

6. The method as recited in claim 1, further comprising:
performing garbage collection to delete the one or more classes referenced by the de-referenced class loader.

7. The method as recited in claim 1, further comprising:
marking the de-referenced class loader as unreachable.

8. The method as recited in claim 1, further comprising:
marking the one or more classes referenced by the de-referenced class loader as unreachable.

9. The method as recited in claims 6, wherein performing garbage collection to delete the one or more classes referenced by the de-referenced class loader comprises:
determining that the class loader is unreachable;
ascertaining that the unreachable class loader has one or more classes associated therewith; and
marking the one or more classes as unreachable.

10. The method as recited in claim 9, further comprising:
freeing memory associated with the class loader; and
freeing memory associated with the one or more classes.

11. The method as recited in claim 1, further comprising:
searching for all objects and classes that are unreachable; and
deleting the unreachable objects and classes from associated memory locations,
wherein each of the objects is an instance of a class.

12. The method as recited in claim 1, further comprising:
releasing memory consumed by the de-referenced class loader and associated classes.

13. The method as recited in claim 12, wherein releasing memory consumed by the de-referenced class loader and associated classes comprises:
marking the class loader as unreachable;
deleting the unreachable class loader from an associated memory location;
ascertaining that the unreachable class loader has one or more associated classes;
marking the one or more associated classes as unreachable;
searching for unreachable classes in memory; and
deleting the one or more associated classes from associated memory locations.

14. The method as recited in claim 13, wherein deleting the unreachable class loader from an associated memory location is performed in a first pass and deleting the one or more associated classes from associated memory locations is performed in a second pass.

15. A method of loading and unloading classes associated with multiple applications, the method comprising:
constructing a class loader for each one of a plurality of applications such that each one of a plurality of class loaders is adapted for loading classes associated with one of the plurality of applications;
employing one or more of the plurality of class loaders to load one or more classes associated with the corresponding application such that the one or more of the class loaders each maintain a reference to the classes associated with the corresponding application; and
rendering the one or more of the plurality of class loaders and the classes referenced by each of the plurality of class loaders unreachable when the corresponding application has completed its operation, thereby enabling the classes referenced by each of the plurality of class loaders to be unloaded during garbage collection.

16. The method as recited in claim 15, wherein rendering the one or more of the plurality of class loaders unreachable comprises de-referencing the one or more of the plurality of class loaders.

17. The method as recited in claim 15, further comprising: performing garbage collection to delete classes referenced by the unreachable class loaders.

18. A method of loading and unloading classes associated with an application in an application manager, the method comprising:
(a) receiving a load signal indicating that an application is to be loaded;
(b) constructing a class loader for the application, the class loader being adapted for loading classes associated with the application;
(c) receiving a start signal indicating that the application is to be started;
(d) employing the class loader to load one or more classes associated with the application such that the class loader maintains a reference to the one or more classes;
(e) de-referencing the class loader for the application such that the class loader and the one or more classes become unreachable when execution of the application ends or is terminated, thereby enabling the one or more classes associated with the application to be unloaded during garbage collection; and
(f) repeating steps (a) through (e) for a plurality of applications such that a plurality of class loaders are constructed and employed to load and unload classes associated with the plurality of applications.

19. The method as recited in claim 18, wherein constructing the class loader is performed in response to receiving the load signal and employing the class loader to load one or more classes associated with the application is performed in response to receiving the start signal.

20. The method as recited in claim 18, further comprising:
receiving a stop signal indicating that the application is to be stopped.

21. The method as recited in claim 20, wherein de-referencing the class loader is performed when the stop signal is received.

22. The method as recited in claim 18, wherein de-referencing the class loader is performed when execution of the application completes or when execution of the application is terminated by an application manager responsible for constructing the class loader.

23. A method of loading classes associated with one or more applications, the method comprising:
(a) constructing an application manager adapted for constructing a separate class loader for each of the applications and de-referencing the constructed class loader when execution of the corresponding one of the applications ends or when execution of the corresponding one of the applications is terminated, the class loader being adapted for loading classes associated with the corresponding application;

(b) receiving an application;
(c) employing the application manager to construct a class loader for the received application;
(d) employing the class loader to load one or more classes associated with the received application such that the class loader maintains a reference to the one or more classes; and
(e) employing the application manager to de-reference the class loader when execution of the received application ends or when execution of the received application is terminated.

24. The method as recited in claim 23, further comprising:
employing the application manager to de-reference the class loader for the application such that the class loader is unreachable.

25. The method as recited in claim 23, further comprising repeating steps (b), (c), and (d) for each application received.

26. The method as recited in claim 25, further comprising de-referencing a class loader associated with an application when execution of the application ends or execution of the application is terminated, thereby enabling the class loader and associated classes to be unloaded during garbage collection.

27. A system for loading and unloading classes associated with one or more applications, the system comprising:
a plurality of class loaders, each one of the plurality of class loaders being adapted for loading classes associated with one of a plurality of applications; and
an application manager adapted for employing one of the plurality of class loaders to load classes associated with one of the plurality of applications and adapted for de-referencing the one of the plurality of class loaders in response to a predetermined condition, thereby enabling the classes associated with each of the plurality of class loaders to be unloaded during garbage collection.

28. A system for loading classes associated with one or more applications, the system comprising:
a memory; and
a processor, the processor in conjunction with the memory implementing an application manager adapted for constructing a separate class loader for each one of a plurality of applications, each class loader being adapted for loading classes associated with the corresponding application, the application manager operating to de-reference the constructed class loader when execution of the corresponding application ends or when execution of the corresponding application is terminated by the application manager.

29. The system as recited in claim 28, further comprising:
a first class loader adapted for loading classes associated with a first application.

30. The system as recited in claim 29, wherein the application manager is linked to the first class loader.

31. The system as recited in claim 29, further including:
a memory storing therein a first set of classes associated with the first application; wherein the first class loader is linked to the first set of classes.

32. The system as recited in claim 28, wherein the system is a digital television.

33. The system as recited in claim 28, wherein the system is a digital television receiver.

34. A digital television receiver for loading and unloading classes associated with one or more applications, comprising:
a plurality of class loaders, each one of the plurality of class loaders being adapted for loading classes associated with one of a plurality of applications; and
an application manager adapted for employing one of the plurality of class loaders to load classes associated with one of the plurality of applications and adapted for de-referencing the one of the plurality of class loaders in response to a predetermined condition, thereby enabling the classes associated with each of the plurality of class loaders to be unloaded during garbage collection.

35. In a digital television, a system for loading classes associated with one or more applications, the system comprising:
a memory; and
a processor, the processor in conjunction with the memory implementing an application manager adapted for constructing a separate class loader for each one of a plurality of applications, each class loader being adapted for loading classes associated with the corresponding one of the plurality of applications, the application manager operating to de-reference the constructed class loader when execution of the corresponding application ends or when execution of the corresponding application is terminated by the application manager.

36. A computer program product adapted for causing a processor to load and unload classes associated with an application, the computer program product comprising:
a computer-readable medium storing thereon computer-readable instructions, including:
instructions for constructing a separate class loader for each one of a plurality of applications, each class loader being adapted for loading classes associated with the corresponding application;
instructions for employing a class loader for one of the plurality of applications to load one or more classes associated with the corresponding application such that the class loader maintains a reference to the one or more classes; and
instructions for de-referencing a class loader for one of the plurality of applications such that the class loader is unreachable, thereby enabling the classes associated with each of the plurality of class loaders to be unloaded during garbage collection.

37. A computer program product adapted for causing a processor to load classes associated with one or more applications, the computer program product comprising:
a computer-readable medium storing thereon computer-readable instructions, including:
instructions for constructing an application manager adapted for constructing a separate class loader for each of the applications and de-referencing the constructed class loader when execution of the corresponding one of the applications ends or when execution of the corresponding one of the applications is terminated, the class loader being adapted for loading classes associated with the corresponding application;
instructions for receiving an application;
instructions for employing the application manager to construct a class loader for the received application;
instructions for employing the class loader to load one or more classes associated with the received application such that the class loader maintains a reference to the one or more classes; and
instructions for de-referencing the class loader for the received application such that the class loader is unreachable, thereby enabling the classes associated with each of the plurality of class loaders to be unloaded during garbage collection.

* * * * *